United States Patent [19]

Yavuz et al.

[11] Patent Number: 5,340,516

[45] Date of Patent: * Aug. 23, 1994

[54] THERMAL SHOCK AND CREEP RESISTANT POROUS MULLITE ARTICLES PREPARED FROM TOPAZ AND PROCESS FOR MANUFACTURE

[75] Inventors: Bulent O. Yavuz, Plainfield; Matthew P. Larkin, Phillipsburg; Gary W. Rice, Scotch Plains; Kenneth E. Voss, Somerville, all of N.J.

[73] Assignee: Engelhard Corporation, Iselin, N.J.

[ * ] Notice: The portion of the term of this patent subsequent to Jul. 16, 2010 has been disclaimed.

[21] Appl. No.: 93,104

[22] Filed: Jul. 16, 1993

Related U.S. Application Data

[60] Division of Ser. No. 727,207, Jul. 9, 1991, Pat. No. 5,252,272, which is a continuation-in-part of Ser. No. 386,186, Jul. 28, 1989, abandoned, and a continuation-in-part of Ser. No. 567,995, Aug. 16, 1990, Pat. No. 5,173,349.

[51] Int. Cl.$^5$ .................. B32B 3/12; C04B 35/10

[52] U.S. Cl. .................. 264/63; 264/177.12; 428/116

[58] Field of Search ............ 264/62, 63, 177.12; 428/116

[56] References Cited

U.S. PATENT DOCUMENTS

| | | | |
|---|---|---|---|
| 4,910,172 | 3/1990 | Talmy et al. | 501/95 |
| 4,911,902 | 3/1990 | Talmy et al. | 501/86 X |
| 4,948,766 | 8/1990 | Talmy et al. | 501/128 |
| 5,098,455 | 3/1992 | Doty et al. | 55/523 |
| 5,173,349 | 12/1992 | Yavuz et al. | 428/116 |
| 5,252,272 | 10/1993 | Yavuz et al. | 428/116 X |

*Primary Examiner*—Henry F. Epstein
*Attorney, Agent, or Firm*—Inez L. Moselle

[57] ABSTRACT

Particles of an interconnected three-dimensional network of bar-like topaz crystals are used as a reactant (with added silicon dioxide, or a mixture with added silicon dioxide and hydrated aluminum fluoride or added silicon dioxide, hydrated aluminum fluoride and alumina) to form mullite whisker honeycomb articles suitable as catalyst supports.

1 Claim, 6 Drawing Sheets

THERMAL SHOCK AND CREEP RESISTANT POROUS MULLITE ARTICLES PREPARED FROM TOPAZ AND PROCESS FOR MANUFACTURE

This is a division of copending application Ser. No. 07/727,207, filed Jul. 9, 1991, now U.S. Pat. No. 5,252,272, which is a continuation in part of Ser. No. 07/386,186, filed Jul. 28, 1989, now abandoned, and Ser. No. 07/567,995, filed Aug. 16, 1990, now U.S. Pat. No. 5,173,349.

BACKGROUND OF THE INVENTION

This invention relates to ceramic articles based on a three-dimensional interconnected mullite whisker crystal network and is specifically directed to the use of topaz crystals as a reactant in an in situ synthesis of mullite whiskers to densify and strengthen mullite whisker articles produced without conventional sintering. In particular, the invention relates to the reaction in situ of interconnected topaz crystals and silicon dioxide or topaz crystals, silicon dioxide and hydrated aluminum fluoride in shaped green bodies, especially extruded honeycombs.

Shaped ceramic articles which exhibit a high degree of thermal shock and creep resistance have a number of commercially important applications, for example, as diesel particulate traps, hot gas filters, molten metal filters, substrates for exhaust catalysts, catalytic substrates for ozone conversion, catalytic substrates for precious metal combustors (Catcom) used to power gas turbines and in metal matrix composites. Several major problems, however, hinder such uses of ceramics. First, ceramics are susceptible to damage, such as cracking, caused by thermal shock and/or creep. Another problem results from the fact that ceramic structures frequently are difficult to machine or to join, making it difficult to manufacture ceramic articles having complex shapes. This is especially true of thin-walled structures such as honeycombs.

Mullite is widely used in numerous ceramic applications and is a crystalline aluminum silicate of the approximate empirical composition $3Al_2O_3 \cdot 2SiO_2$. Mullite is characterized by a distinctive diffraction pattern, but mullite occurs in distinctly different crystalline shapes, the most common being prismatic cigar-shaped crystals, sometimes referred to as "acicular" form. This form of mullite occurs as "clumps" and may be obtained, for example, by firing clays. Mullite can also be synthesized as smooth elongated single crystals (whiskers). Whiskers have a significantly higher aspect ratio than the prismatic crystals in conventional mullite materials. Mullite can also be synthesized as highly elongate fibers. Generally, all forms of mullite have many of the known valuable properties of alumina, such as a high melting point and, in addition, exhibit other valuable physical and chemical properties. However, when mullite is formed as whiskers, the unusual strength associated with single crystals is obtained. Topaz ($AL_2SiO_4F_2$) is usually obtained as stocky, bar-like crystals which have a significantly lower aspect ratio than mullite whiskers. Topaz is characterized by a unique x-ray diffraction pattern and can be converted to various forms of mullite by reactions with silicon dioxide.

The art is replete with suggestions to use various whiskers, including mullite whiskers, to reinforce ceramics. Generally, in such use the whiskers are employed as discrete, nonagglomerated crystals which are formed into composites by conventional sintering technology. This inherently limits the content of mullite in the ceramic articles so produced and introduces potentially fluxing materials. Thus mullite articles based on composites including addition of discrete single whiskers cannot be used at temperatures as high as those that pure mullite can survive, and production of such composites necessitates handling fibrous material.

Various methods have been suggested in the prior art for the production of mullite in whisker form. Generally, these involve solid-solid reactions at high temperatures with evolution of gaseous by-product. Formation of mullite whiskers from the reaction of anhydrous aluminum trifluoride (or aluminum trifluoride and alumina) and silicon dioxide with a topaz intermediate is described in U.S. Pat. Nos. 4,910,172, 4,911,902, and 4,948,766, all to Talmy et al. The reactants pass through a topaz crystalline phase before mullite crystals are formed. According to the teachings of the patents, the solid reactants must be anhydrous and an anhydrous silicon tetrafluoride atmosphere must be present to form the mullite whiskers. In U.S. Pat. No. 4,948,766 a porous shaped preform containing the reactants and an organic binder is converted to a highly porous felt, exemplified in examples as small discs, the green bodies going through a topaz intermediate stage without isolation of the topaz intermediate. The initial green bodies are highly porous as are the felts.

Our copending application, U.S. Ser. No. 07/386,186, and now abandoned, is directed to an in situ chemical route for making porous mullite ceramic parts in near net shape from preformed precursors. The invention permits the formation of highly complex shapes such as thin-walled honeycombs, and it entails heating coherent green bodies containing a mixture of finely powdered hydrated aluminum fluoride and silicon dioxide in a molar ratio of approximately 12:13, along with a fugitive binder, while sweeping the volatile reaction products including silicon tetrafluoride and water from the bodies. The reactants form mullite according to the following equation:

$$12AlF_3 \cdot xH_2O + 13SiO_2 = 2(3Al_2O_3 \cdot 2SiO_2) + 9SiF_4 + xH_2O \qquad (1)$$

X is suitably about 3 and can be as high as 9. At temperatures of about 600° C.–800° C. a topaz intermediate ($Al_2SiO_4F_2$) is formed and above 890° C. this reaction results in the formation of mullite whiskers. The topaz intermediate is not recovered in this process.

Mullite whiskers products obtained by reaction (1) are highly porous, typically about 80% porous, and thus they are relatively weak. However, many of the important potential commercial applications for high mullite whisker content shaped articles require higher strength while still possessing desirable micro and macro-structures.

Summary of the Invention

It has now been found that useful mullite whisker articles can be produced by preparing interconnected topaz crystals from near stoichiometric mixtures of hydrated aluminum fluoride and silicon dioxide in the form of coherent green bodies by an in situ process and then using the interconnected topaz thus recovered (or interconnected topaz crystals from another source) as a reactant with additional silica or silica and aluminum fluoride in the form a shaped bodies to form densified mullite whisker articles by in situ synthesis.

In one embodiment of the invention, topaz crystals prepared from a near stoichiometric mixture of hydrated aluminum fluoride and silicon dioxide are mixed with and formed into coherent green bodies, such as a spaghetti-like extrudate, along with a fugitive binder, and the bodies are heated to temperatures in the range of about 600°–800° C. to form bodies in essentially the same size and shape as the green bodies, but composed of interconnected bar-like topaz crystals. During the reaction, evolved volatiles, including water and silicon tetrafluoride, are swept from the solids. Since the topaz crystals are not whiskers, they are only weakly interconnected. Thus the topaz bodies are not relatively frangible and can be ground, for example, to a size finer than 100 mesh, or the extrudate can be mixed in a ball mill with other ingredients which will result in the breakdown of the extrudates into small granules of interconnected topaz crystals.

In practice of one preferred embodiment of the invention, the topaz so formed is then made into another shaped green body, preferably a honeycomb, along with additional hydrated aluminum fluoride and silicon dioxide, these materials being used in an amount, relative to the topaz, such that a portion of the silicon dioxide reacts with the topaz to form mullite whiskers, and another portion of the dioxide reacts with the aluminum fluoride, to form additional mullite whiskers. This green body is then fired while sweeping volatiles by means of air or nitrogen to form an interconnected network of mullite whiskers and produce an article of greater density and strength than is obtained by Reaction (1). In an especially preferred embodiment, the fired body derived from these two sources of mullite whiskers is further densified by being infiltrated with an alumina-silica sol precursor to mullite. This composite is fired to convert the sol to additional mullite which will not be, however, in whisker form.

In another preferred embodiment of the invention, mullite whisker articles of greater strength and density are prepared by mixing agglomerates of topaz crystals, prepared as described above, with a quantity of silicon dioxide stoichiometric to form mullite along with a fugitive binder. The mixture is formed into green bodies which are fired at a time and temperature sufficient to form mullite, e.g. 890° C. or above, whereby all of the mullite whiskers are formed by the reaction of the interconnected crystal topaz precursor with the added silicon dioxide. This leads to less porous (denser) articles than are obtained by Equation (1), as well as articles that are denser than those obtained by reaction of agglomerates of topaz crystals with appreciable amounts of added aluminum fluoride and silica dioxide.

A preferred use of honeycomb whisker products is as the substrate for a precious metal catalyst for use with Catcom applications. In such applications substrate material of thermal shock resistance is required because it must survive thermal stresses induced by significant thermal gradients created as a result, for example, of emergency shutdowns of the gas turbine. The shutdowns are anticipated to occur numerous times during the lifetime of the generator. A simplified way of expressing thermal stress in a solid cylindrical body can be given by the following relation:

$$\sigma = E\alpha(T_s - T_c)/(2(1-\nu))$$

where $\sigma$ is thermal stress, E is the elastic modulus, $\alpha$ is thermal expansion coefficient, $\nu$ is Poisson's ratio, $T_s$ and $T_c$ are the surface and center temperatures of the cylinder, respectively.

DETAILED DESCRIPTION OF THE INVENTION

In putting the instant invention into practice, the topaz reactant is preferably prepared by mixing aluminum fluoride hydrate, e.g., $AlF_3.3H_2O$, with amorphous or crystalline silicon dioxide, preferably using proportions substantially stoichiometric to form topaz without free silicon dioxide, e.g., from about 54 to 62 parts by weight aluminum trifluoride (anhydrous basis) to 42 parts by weight silicon dioxide corresponding to about 1 (one) mole of $AlF_3$ per mole $SiO_2$. The aluminum fluoride and silicon dioxide are in particulate form. The mixture is thoroughly mixed with a temporary binder material such as methyl cellulose, the binder either being added dry followed by addition of a liquid vehicle, preferably water, or binder is added as an aqueous solution or dispersion. Sufficient liquid vehicle is added to provide a mix of extrudable consistency. Prior to extrusion, the mixture is thoroughly mixed and extruded to form green bodies in a form amenable to drying and firing. Sufficient binder is used to achieve a green extrudate of adequate strength to facilitate handling. Excellent results have been obtained by extruding the mixture into thin, spaghetti-like strands which can be of any appropriate diameter, e.g., 0.8 mms. to 6.4 mms. These strands can be chopped into pellets before drying and firing, or the strands can be dried and fired. Extrudates of interconnected topaz crystals are then crushed into finer particles when milled.

It is preferable to dry the green bodies before firing in order to strengthen the green bodies by the gelation of a binder such as methyl cellulose so that the pieces can be handled with more ease during the consequent firing step. Firing is preferably carried out by a furnace which has capabilities of operating at temperatures as high as 1500° C. with capabilities of driving out the fluorine containing gases evolved during the topaz and mullite forming reactions. Removing of fluorine containing gases is accomplished by peristaltic pump(s) which are placed outside the furnace but are connected via refractory tubing to the exit gate of the furnace. The pumps, when operational, suck the gases from inside the furnace outside and send gases to a scrubbing unit to convert the products to relatively non-hazardous solid products such as NaF and $SiO_2$. Peristaltic pumps are needed to protect the furnace furniture and heating elements by removing the fluorine containing gases, particularly HF, from the reaction chamber by minimizing the residence time of these gases inside the furnace. As a result of this pumping action, silicon tetrafluoride is continuously removed from the reaction chamber, and also faster than it normally would.

In the practice of the present invention, the reactants to produce mullite including interconnected topaz crystals preferably formed as described above, are mixed thoroughly with silicon dioxide or silicon dioxide and hydrated aluminum fluoride along with a suitable binder, such as methyl cellulose and water. Other suitable binders include, e.g., alginate, polyethylene oxides, resins, starches, guar gum and waxes. Choice of suitable binders for making the topaz intermediate as well as the mullite whiskers article are discussed in U.S. Pat. No. 4,551,295, the teachings of which are incorporated herein by reference. Following mixing with a binder the reactants are formed into a desired shape using extrusion, injection molding, low pressure injection molding, pressing, tape casting or any other suitable ceramic processing technique.

Aluminum oxide may also be added to the reactive ingredient mix comprising aluminum fluoride hydrate, silicon dioxide and topaz as fine particles and at a weight ratio of 1 to 10% based on the total dry weight of the reactive ingredients, i.e., aluminum fluoride hydrate plus silicon dioxide, topaz and alumina. Alpha alumina is suitable, although other forms can be used. The main reason for aluminum oxide addition is to have it react with unreacted silicon dioxide at elevated temperatures to form mullite particulates. A portion of the silicon dioxide may remain unreacted because a portion of aluminum fluoride may volatilize before it reacts with silicon dioxide. In cases where stoichiometric amounts of aluminum fluoride and silicon dioxide are added to the reactive ingredient mix, this would result in excess silicon dioxide, which may not be desired in the final product. Excess aluminum oxide will then react with this silica to form mullite particulates. When aluminum oxide is added to the reactive ingredient mix, some portion of it would react with this excess silica while the remainder may stay unreacted. Thus the final fired honeycomb product may contain unreacted aluminum oxide.

In carrying out the invention, formed pieces of the powdered reactants and binder are fired to a desired temperature (900° C. and above) in a flowing stream of air or nitrogen to sweep volatiles including but not limited to silicon tetrafluoride and water, and, while the original shape is retained, the precursor mix is transformed to mullite whiskers. There is no matrix, and the product is in the form of very porous shaped articles consisting essentially of interconnecting and branched mullite whiskers.

Inherent in this method of manufacturing mullite is the possibility that the fired articles may contain trace amounts of fluoride ions. Since even very low concentrations of fluoride ion can poison many catalysts, it is important that the formed mullite articles be essentially fluoride-free, if they are to be used as support for metallic catalysts. One aspect of the present invention involves preparation of mullite articles by the described route, and obtaining such articles in a fluoride-free condition. Practical methods of fluoride ion removal include the use of steam or superheated steam. For example, a honeycomb useful as the support for metallic catalyst can, after it is fired, be immersed in a superheated (900° C.) concentrated sulfuric acid bath and/or have steam passed therethrough to remove fluoride ion. Alternatively, a hydrogen purge is an efficient remover of fluoride ion. The result is an essentially fluoride-ion-free mullite honeycomb support.

The method of making porous mullite articles described here is especially attractive because by this route shaped articles with very high thermal shock resistance can be produced at comparatively low cost. The articles are lightweight and have very high creep resistance. According to the invention, articles with complex or thin shapes can be produced with relative ease. Examples are honeycomb shapes, corrugated sheets, reticulated (comb-shaped) pieces, foams, donuts or any other desired functional shape chosen to serve as a filter, catalytic substrate, particulate trap or other functional purpose. These articles can be made into a near net-shape and/or machined extensively without cracking. Catalytic substrate walls with high roughness can be produced, and high specific strength (strength/density) mullite articles attained without any residual glassy phase present.

Refractory catalyst supports such as those described in U.S. Pat. No. 3,565,830 (incorporated herein by reference) constitute an advantageous utilization of the present invention. Mullite supports prepared according to the present invention may be readily coated with catalytically active oxide, such as alumina, and then impregnated with a platinum group metal for use with catalysts such as those described in the reference patent.

Refractory catalyst supports are also required for process directed to catalytically supported thermal combustion (Catcom) described for example in U.S. Pat. Nos. 3,928,961 and 4,893,465 (incorporated herein by reference). Mullite catalyst supports made according to the present invention are exceptionally well adapted for use in catalytic combustion processes such as those described in these patents.

Two articles made by the precursor mix according to the present invention can be joined to each other via thermal treating. Preparing a good joint between two similar materials has advantages. Certain catalytic applications require large size of honeycomb pieces. A diesel particulate filter can be about 12 inches in diameter or more. A large piece of honeycomb shaped article is required for catalytic combustion applications. Extrusion of such large pieces is very difficult. Since the joint between two articles made from this material has good quality, then large pieces can be assembled by joining smaller extruded parts. For example, a cylindrical honeycomb material can be assembled by fusing four pieces of quadrant cylinders. In this method, several small pieces of green particulate aluminum fluoride, silicon dioxide and binder admixture are joined either by placing in integral contact or pressing smaller unfired pieces together before firing, so that upon firing large articles of relatively more complex shapes are formed. See Examples 4 and 16. Articles made with a topaz reactant, e.g. Example 16, to form a joint are preferred because of the increased density.

Pure mullite ceramics of the present invention have a very high melting point (>1880° C.). Production of articles composed of whiskers is an especially straightforward and clean process, since there is no need to disperse mullite or other whiskers, the whiskers being formed during heating of the shaped article made of the precursor mix, thus avoiding health and safety problems associated with respirable whiskers.

Clay can also be used in small amounts to improve the extrudability of a honeycomb. Clay is more plastic than either silica or aluminum fluoride or interconnected topaz. The increased plasticity of the extrudate mix which accompanies clay addition enhances the ease of extrusion. Such clay can be added to the dry mix or entrapped in the binder solution. Suitable clays include, for example, bentonite, attapulgite, palygorskite, montmorillonites, pyrophyllite and kaolin.

A further aspect of the invention involves improving the strength of mullite articles by grinding the reactants prior to conversion to topaz and prior to mixing the topaz with other reactants to form mullite whiskers. Grinding of reactants to particle sizes of less than about 45 microns can improve the compression strength of the mullite articles. Such grinding or particle size reduction can be conducted by a variety of methods, ball milling being one of the more convenient well known methods. Ball mixing will also serve to reduce a spaghetti-like extrudate of interconnected topaz crystals to small granules, e.g. finer than 45 microns, of interconnected topaz.

Finally, as is appreciated by those skilled in the art, whisker processing has the potential for creating serious health hazards. In the manufacturing route of the present invention, whiskers are formed in-situ from powders at elevated temperatures and remained interconnected. Thus, there is no need to handle loose whiskers during the manufacture route which is the subject of the instant invention.

Following is a detailed explanation of factors to be considered in selecting ingredients used in practice of the invention, especially as such factors affect the micro-structure and macro-structure of mullite whisker products of the invention.

The mullite whisker articles of our copending application Ser. No. (07/386,186) are made of mechanically interconnected mullite single crystal whiskers and have low elastic modulus. Low elastic modulus is mainly due to the very open nature of the product. An article made by reacting aluminum fluoride trihydrate and silica in accordance with Equation(1) is 80% or more porous. In a typical reaction:

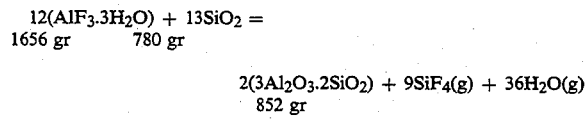

$$12(AlF_3.3H_2O) + 13SiO_2 =$$
1656 gr          780 gr $$2(3Al_2O_3.2SiO_2) + 9SiF_4(g) + 36H_2O(g)$$
852 gr

A total of 2436 grams of solids yield 852 grams of solid mullite. This number suggests that 65% of the starting solids react to form gaseous products. However, additional porosity is imparted by evolution of volatile by-products derived from agents used in binding these reactants to a new net shaped article. Thus the reactants are mixed with a binder, preferably an organic binder, such as methyl cellulose, in a weight ratio preferably between 2-8 weight percent. A liquid binder/plasticizer, preferably water, is added to the mixture at a weight ratio between 10-30%, and typically about 20% to facilitate forming. The mixture is then homogenized to a dough by using one of several available mixing techniques, such as pug milling followed by extruding the mix through a die orifice to form honeycomb shapes. The honeycomb is then dried and fired in a furnace to complete the reaction to mullite.

The extruded green body obtained by reaction (1) is never 100% dense. There will be some porosity in the body, depending on the quality of dispersion, particle size distribution, extrusion pressure, die shape and some of the extruded parameters. Porosity of the green body will vary between 1-15%, which is significantly less than that of green discs of U.S. Pat. No. 4,984,766. If one assumes 5% porosity in the green honeycomb (i.e. the actual density is 5% less than the theoretical density) and assumes water and binder contents of 20% and 5% of the reactant solids, and the density of the fired piece is expected to be 23% of the theoretical density of mullite. As an example, 1656 grams of aluminum fluoride trihydrate, 780 grams of silicon dioxide, 487 grams of water and 122 grams of binder are mixed and formed to a honeycomb, which is then fired to obtain 852 grams of mullite. The product is only 28% of the original weight. Combined with the 5% inherent porosity, the mullite whisker honeycomb is about 23% dense or about 77% porous. This calculation suggests that fired honeycomb pieces of our copending patent application are 80% porous. Measurements confirm this estimate.

A very important factor involved in the preparation of mullite whisker honeycomb is that the fired honeycomb must retain the shape of the green one despite the fact that the green body loses a significant portion of its original weight. If the microstructure of mullite obtained from the reaction were such that the mullite grains were dense and equiaxed, i.e., more or less isotropic in three dimensions, then there could not be strong connectivity between each grain. With lack of strong 3-dimensional connectivity, the original honeycomb shape could not be retained. The product would turn into loose powder form upon firing, and collapse from the honeycomb shape. A rigid honeycomb shape is obtained upon firing because of the unique microstructure as shown in FIGS. 2-4. The mullite crystals are formed in the shape of whiskers. Each whisker is dense, single crystalline which is branched as shown in FIG. 4, with the whiskers being mechanically connected to another making a 3-dimensional rigid body. Whiskers are anisotropic. Their aspect ratio is high, generally 100 or more. A three-dimensional body made of interconnected whiskers can have 80% or more void space and still be rigid. This characteristic of the mullite made from the hydrated aluminum fluoride route is unique. Any dense, solid mullite powder, single or polycrystalline, but equiaxed with very little or no anisotropy, cannot produce a 3-dimensional rigid body with 80% void space.

The highly open nature of the microstructure leads to desirable low elastic modulus. Porosity, in general, decreases elasticity of a ceramic material. There is no well understood relation between the elastic modulus and porosity, but several models have been developed and exist in the literature. One model is described by:

$$E = E_o e^{-bP}$$

or $$E = E_o exp(-bP)$$

where $E_o$ is elastic modulus of the 100% dense body, P is porosity, b is an empirical constant. The relation suggests that E is decreased significantly with porosity. Low E values are desirable in a Catcom substrate. Lower E means lower thermal shock susceptibility. A material composed of dense solid single crystals, which can be formed in 80% or more void space due to highly anisotropic nature of its individual grains, and where these grains are interconnected to give rigidity to the body is a good candidate for Catcom application due to its exceptionally low elastic modulus.

However, strength of the substrate is another key parameter. Stronger substrates have more chance to survive service during use. The mullite whisker material obtained from reaction (1) is weak. Our copending application teaches the substrate obtained by that reaction can be strengthened by one of several routes or by their combination. However, none of these routes provides the multiple benefits obtained by growing mullite crystals from agglomerates of interconnected topaz.

In accordance with the instant invention, bar-like topaz crystals, preferably interconnected topaz crystals, are added to the mix. The interconnected topaz is preferably formed at a temperature between 600°–800° C. via the following reaction:

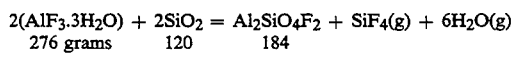
$$2(AlF_3 \cdot 3H_2O) + 2SiO_2 = Al_2SiO_4F_2 + SiF_4(g) + 6H_2O(g)$$
276 grams   120        184

Topaz crystals formed by this reaction are stocky or bar-like and interconnected. At higher temperatures, topaz reacts with silica to form interconnected mullite whiskers via reaction.

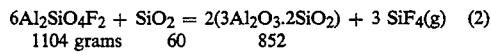
$$6Al_2SiO_4F_2 + SiO_2 = 2(3Al_2O_3 \cdot 2SiO_2) + 3SiF_4(g) \quad (2)$$
1104 grams   60        852

Reaction 2 suggests that loss of weight is about 27%. This number is significantly lower than that obtained from Reaction 1. Thus if a substrate is made via Reaction 2, the interconnected mullite whisker product is much denser as shown by comparison of in the micrographs in FIGS. 9 and 10. The strength of the mullite substrate obtained from topaz is therefore higher than that obtained from aluminum fluoride trihydrate and silica.

As noted above, increasing density increases elastic modulus which then increases thermal shock susceptibility. Thus, there is a trade-off between density and strength. Rewriting the equation above for the relationship of factors involving thermal stress in solid body, it can be calculated that optimization of the product for thermal shock susceptibility is achieved by maximizing the $\sigma/E$ ratio.

The densest mullite whisker product can be obtained by Reaction (2) and is hereinafter denoted T-100, meaning that the product is composed of interconnected whiskers produced by using interconnected topaz and silica only. The product obtained by Reaction (1) is denoted by T-0, since no topaz was added to the original reaction mix. A T-25 product means appropriate amounts of topaz and silica dictated by Reaction (2) are added to a mixture of aluminum fluoride trihydrate and silica dictated by Reaction (1) such that, upon firing, 25% of the interconnected mullite whiskers are obtained by the reaction of added topaz powder with silica (Reaction 2) while the rest of the whiskers originate from the reaction of hydrated aluminum fluoride with silica (Reaction 1).

Theoretical porosity contents for mullite whisker materials were calculated using several assumptions namely:
a) The extruded green honeycomb is 95% dense, i.e. it retains 5% porosity.
b) The extruded green honeycomb has 5% organic binder by weight.
c) The extruded green honeycomb has a total 20% water and 5% liquid plasticizer by weight of solid reactants.

Based on these assumptions, theoretical porosity contents are:

| MATERIAL | POROSITY, % |
|---|---|
| T-0 | 77 |
| T-25 | 73 |
| T-50 | 67 |
| T-75 | 59 |
| T-100 | 46 |

These calculated porosity values clearly indicate that mullite whisker honeycombs become denser as their topaz content increases. This is due to the fact that more fluoride is lost in $AlF_3 \cdot 3H_2O$ than in $Al_2SiO_4F_2$ and also that there are 3 moles of water in a hydrous aluminum fluoride molecule whereas there is no water in anhydrous topaz. At high temperatures water in fluoride will evaporate, causing significant material loss from the reactive ingredient mix. Also fluoride will be lost at even higher temperatures, causing additional loss from the solid phase. Thus, as the aluminum fluoride trihydrate content of the starting mixture decreases (i.e. T-number increases) there will be less loss of matter and the final product becomes denser. Within the scope of the invention are products prepared from mixes in which topaz (T) content is defined by the equation T-X, in which X is greater than 0. T-25 through T-100 articles (about 50% to 75% porosity) are preferred and T-50 through T-100 (about 45% to 70% porosity) are especially preferred.

Addition of topaz to the reactive mix is not the only way to increase density of the honeycomb. However topaz is unique because the densified body is still in the form of a body composed substantially completely of interconnected whiskers.

Thus, another approach to densify and strengthen an interconnected mullite whisker substrate is to increase its weight after firing. This technique can be used to further densify mullite whisker products obtained in accordance with this invention from a topaz reactant. Densification can be accomplished by different techniques. One is infiltration. In this case, fired mullite whisker honeycombs are infiltrated with a slurry or the like by dipping. The assembly is then dried and subsequently calcined. The composition of the slurry can be any form of aluminosilicate, or aluminum or silicon based compound, including clays. Preferred is the use of a mixture of alumina silica sols in proportion stoichiometric to form mullite. The slurry is then dried and calcined at a suitable sintering temperature, time and atmospheric condition. The calcined substrate is denser and presumably stronger than the uncoated substrate. A colloidal solution can also be used instead of a slurry. Chemical vapor deposition, chemical vapor infiltration, sputter deposition or any other coating technology may also be suitable for densification. Another densification route is to blend the reactive ingredients with densification aids or fillers and then extrude this mixture, dry and calcine the honeycomb. These additives can be alumina, silica, zirconia or mullite powders, mullite whiskers or any other silicon, aluminum or zirconium based compounds including clays. Illustrative examples demonstrate producing mullite whisker products made with additives such as clays, alumina, mullite or silica sols as part of the reactant mixture and using mullite precursor sol as an infiltration vehicle on the fired honeycomb that can also be applied to whisker products having a topaz precursor.

However, densification increases elastic modulus which is not desired because higher elastic modulus increases thermal shock susceptibility. Thus, a trade-off between strength and thermal shock susceptibility must be made to produce honeycombs which have both adequate strength and thermal shock resistance.

Another key physical requirement for a substrate is high temperature strength and durability. Catcom substrate is operated at high temperatures such as 1250° C. and above in steady-state conditions and for long durations. It is also subjected to steady stress levels. The pressure of the flowing gas can be as high as 10 atmospheres. The pressure acts as stress on the face of the substrate. Thus, the conditions of creep, i.e. time dependent deformation of a material under stress at elevated temperatures, exist in Catcom application. The choice of material should address this issue. The material should possess sufficient strength at elevated temperature but must also be creep resistant.

Example 6 demonstrates that only a 10% drop in strength was observed at 1300° C. for a T-0 article. The drop was limited to 25% of the room temperature strength when a sample of T-0 was tested at 1400° C. It is clear from this example that this mullite whisker material is capable of withstanding high temperatures in short term, and this is expected of articles ranging from T-0 through T-100. This is expected because the melting point of mullite is around 1800° C. and all of these articles can be prepared so that they are composed entirely of mullite. Most of the commercial mullite products have limited use at temperatures in excess of 1300° C. This is because of the viscous deformation of the glassy phase which is common to see along the grain boundaries of mullite and is present because of sintering techniques generally used in preparing mullite ceramics. This glassy grain boundary phase becomes less viscous at elevated temperatures when operated under a steady stress. The viscous relaxation which takes place microscopically creates a damaged zone at the high stress concentration regions causing grain boundary sliding, void growth, etc. These time dependent deformation phenomena called viscous creep, weakens the material and eventually leads it to failure even when it is operated at a low stress level. The TEM microscopy done on the mullite whiskers showed that each individual whisker is single crystalline and the region where two whiskers connect is free of glassy phases (FIGS. 4 & 5). Thus, the mullite whisker material is substantially more creep resistant compared to most of the conventional mullite products.

Another form of long term failure is corrosion related. At high temperatures the atomic mobility of species, or diffusivity, increases causing corrosion or stress corrosion. These phenomena can limit the use of a refractory material which has otherwise good properties such as high strength, thermal shock and creep resistance. Washcoat degradation due to diffusion of species from or to the substrate, or segregation of cationic or anionic species present in the substrate composition towards grain boundaries are among the possible causes of degradation. Mullite material has an advantage here. Mullite is a mixed oxide material with very high degree of covalent bonding for an oxide. Diffusivity of Al, Si and O are low. The mullite whisker material is pure and prepared with no cationic additives. Thus, diffusivity of Group I or II cations is not a major problem. Mullite whisker material is resistant to corrosion related long term failures.

Gas turbines vary in size and capacity. Some systems require a substrate as wide as 22" in diameter. This size is very difficult to extrude. One way of producing large substrates is to make smaller ones and join them. Smaller mullite whisker substrates can be extruded and joined to form larger pieces. Mullite whisker material can be joined relatively easily. Example 4 demonstrates that mullite whisker articles can be joined to form larger pieces and this can be achieved using topaz-derived products. See Example 16. Topaz derived in situ joints are preferred because the mullite thus derived will be denser and the joint stronger. Whiskers from both of the pieces to-be-joined grow and mechanically join to each other producing a clean joint boundary.

As the temperature difference between the surface and the center of the substrate becomes larger, the radial thermal stress induced on the sample increases. Substrate breaks when the induced stress reaches the strength of the material.

The temperature differential, thus thermal stress, depends on the size of the catalytic unit. Obviously, units with larger diameters would experience larger temperature differential and thermal stress. The severity of thermal shock varies from one gas turbine manufacturer to another. However, regardless of the type and size of the power generator, the Catcom substrate should be designed to survive the emergency shutdown trips.

The equation for thermal stress given above shows that variables such as E, $v$ and $\alpha$ are the key physical parameters in determining the induced thermal stress at a given T. A candidate material should possess high strength, low elastic modulus and thermal expansion coefficient so that the magnitude of thermal stress will be low and smaller than the strength of the material to avoid failure during emergency shutdown.

In addition to the microstructure factors affecting design of substrates for applications such as Catcom, there are a number of important design requirements for the substrate which carries the catalyst in Catcom. These are macrostructure factors. The support should be manufactured in large sizes such as 22" in diameter; it should have uniform cross section; it should possess high open frontal area such as 70% or more.

It is essential that momentum profile (mass×velocity) of the incoming gas across the face of the turbine should be uniform for proper functioning of the system. Uniform velocity profile is necessary to maintain constant momentum. Honeycomb structures are used to smooth velocity profiles of flow streams in many applications including gas turbines. Thus, a Catcom substrate made into a honeycomb structure has an advantage over other shapes in improving the incoming gas stream and maintaining its flow uniformity. Uniformity in the cell walls of the honeycomb is also very critical. Gas will flow with higher velocity through a larger cell. The variation of velocity from one cell to another should be avoided. Honeycombs can be manufactured by a number of techniques. Extrusion process produces uniform cell sizes across the face of the substrate and is the preferred method of manufacturing. Any other method used to make Catcom substrate must produce uniform cell sizes in order to be compatible with extrusion. Uniformity in the cell size is essential not only for maintaining a uniform velocity profile but also to maintain constant temperature across the outlet face of the catalyst. It is essential for operating conditions that the gas phase should have a uniform temperature profile when it reaches the turbine. The quality of combustion is affected by cell size. The boundary layer, defined as the stagnant film of gas between the washcoat and the gas phase, is thicker in the larger cell. The honeycomb walls are the heat sources to the system. Heat transfer from the honeycomb walls to the gas phase becomes harder with the increased thickness of the boundary layer. Same is true for mass transfer. Thus, reaction is slower in the more open cells. If nonuniformity exists in the honeycomb, unequal reaction rates will occur as a result of nonuniformity in the cell size. The combustion reactions are exothermic and generate heat. More heat will be generated in the smaller cells, increasing the temperature of the substrate walls and the gas phase which is not desired for turbine operating conditions.

A uniform cross section other than that of a honeycomb can be obtained by extrusion or by some other method. An example is a cross section with a circular hole pattern with each circle having the same radius. This pattern will also allow uniform gas velocity and temperature profile. A very important advantage of honeycomb profile over any other design is that the former will produce less back pressure to the incoming gas stream. Obtaining minimum back pressure is very critical in Catcom application. Higher back pressure will cause higher compression force which results in fuel penalty for the system. Minimum pressure drop increases the efficiency of the system. Energy is provided to turbine by the expansion of the gas phase and is characterized by a PV term. An increase in pressure drop results in a decrease in the amount of energy provided to the turbine.

Finally, in honeycombs, the inner surface of each wall is available for catalysis.

Ideally, cell sizes should be infinitely small with wall thicknesses infinitely thin. However, in practice, when walls are made thinner, extrusion becomes more difficult and also strength of the substrate diminishes. Therefore, cell size and wall thickness in a honeycomb to be used for Catcom application should be optimized amongst the engineering constraints.

An extruded profile with uniform cross section is the preferred structure as Catcom substrate since extrusion produces a pattern with uniform cross section which is essential in producing and maintaining uniform gas velocity and temperature profile. Honeycomb shape, in particular, is preferred because this geometry minimizes back pressure while it provides high available surface area for catalysis.

Mullite whisker honeycomb substrates for Catcom can be used with various precious metal catalysts, including palladium oxide, such as described in U.S. Pat. No. 4,893,463. A mixture of a refractory inorganic binder and a catalytically effective amount of a binary oxide of the formula $Pr_4PdO_7$ is recommended. See U.S. Ser. No. 07/684,631, filed Apr. 12, 1991, now U.S. Pat. No. 5,102,639, the teachings of which are incorporated herein by cross-reference.

BRIEF DESCRIPTION OF THE DRAWINGS

The invention can be further understood by reference to the drawings in which.

To illustrate more completely the invention, the following examples are given. These examples are for purposes of illustration only and are not to be construed as limitations of the invention.

EXAMPLE 1

This example illustrates the production of a T-0 honeycomb. Two-hundred and fifty four grams of aluminum fluoride (Aldrich $ALF_3.2.8\ H_2O$) was added to 123 grams of $-325$ mesh amorphous silica (Thermal American, Montville, N.J.) and ground and mixed in a ball mill for 24 hours. The mix was then placed in a pug mill where 120 ml of 7% Methocel solution was slowly added to the batch during mixing. The mixing continued until an extrudable plastic mass was obtained. The charge was then fed to the extrusion chamber and extruded through a simple honeycomb die, and shapes of approximately 1½" diameter and 2" length were formed. The cell density of the pieces were approximately 11 cells/square inch.

A number of such extruded pieces were placed in an oven at 75° C. so that the Methocel binder gelled. Then the pieces were placed uncovered in a nitrogen flowing tube furnace and heated at a rate of 10° C./min until 350° C. was reached. The pieces were soaked at this temperature for one hour and heated at a rate of 10° C./min until 1000° C. was reached. The samples were then furnace cooled, with room temperature being obtained over the course of several hours. The appearance of these samples (referred to herein as 1(a)) was porous, strong enough to handle without breaking, cohesive, integral and dark grey in color.

One sample was reheated to 1000° C. at a rate of 8° C./min, followed by heating it to 1300° C. at a rate of 5° C./min. The honeycomb piece was held at this temperature for 6 hours. Finally, the piece was cooled from this temperature to room temperature at a rate of 25° C./min. This honeycomb (referred to herein as 1(b)) appeared white, extremely porous, cohesive, integral, strong enough to handle without breaking and very lightweight. The initial and final weights of the honeycomb were 26.13 and 8.42 grams, respectively.

Once piece prepared as in example 1(b) was thermal shocked in a gas fired furnace from 1000° C. to 600° C. at a rate of 25° C./sec. Visual examination showed no evidence of cracking. The same piece was subsequently shocked from 1100°, 1200°, 1300° and 1400° C. to 600° C. at the rates of 23.8°, 25°, 25.9°, 26.7° C./sec, respectively. After each shock, the piece was visually examined and no cracking was observed. Two three-point flexural beams were cut from this piece. The strength of each beam was measured using Instron equipment (Model 4202) at a crosshead speed of 0.0075 in/min. The strength of the porous honeycomb specimens with two cells in width and one cell thickness was measured as 111 psi. The apparent density of the honeycomb wall was measured as 0.48 gr/cc.

Figure 1:
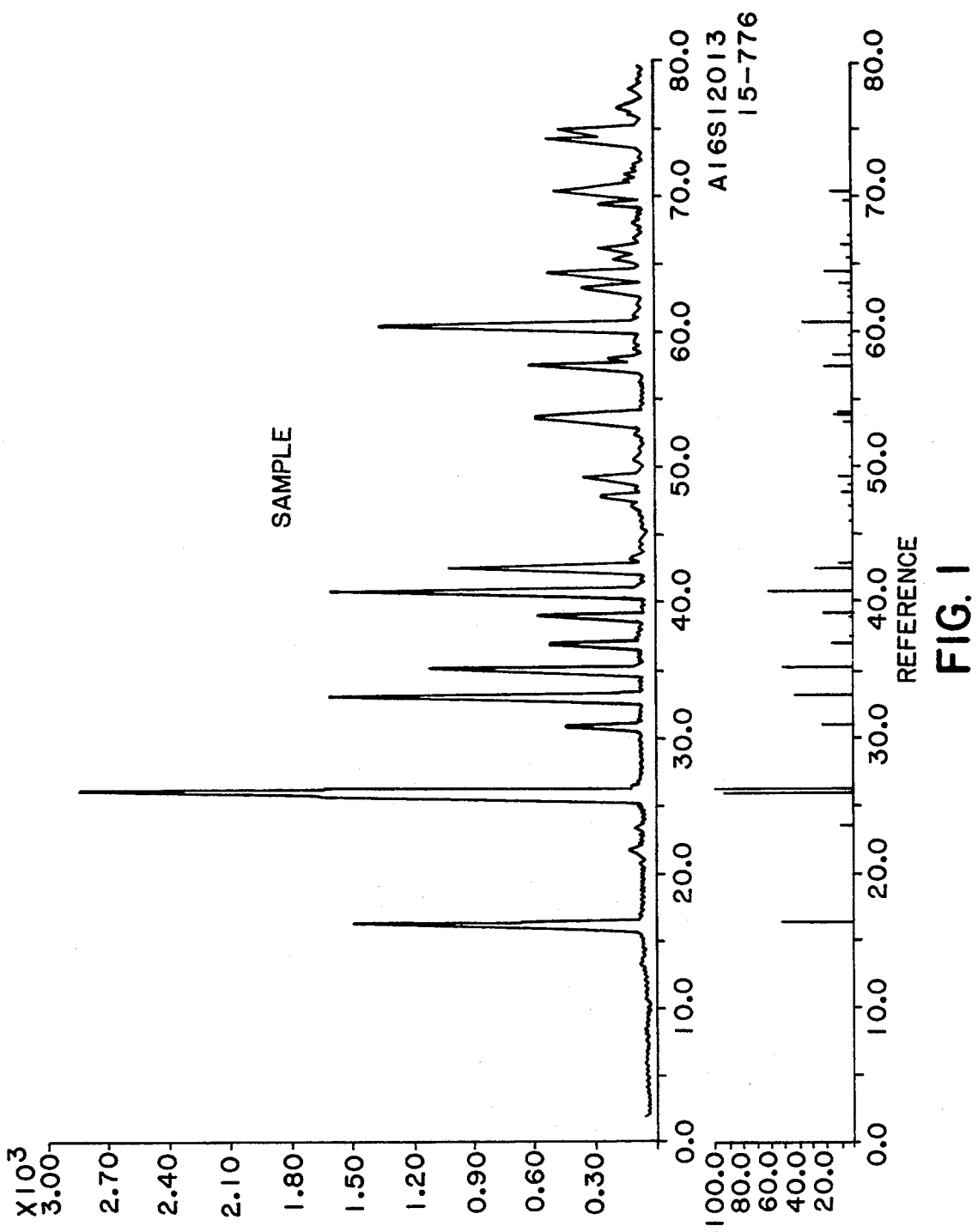
FIG. 1 is an X-ray diffraction pattern of a T-0 specimen.

The X-ray diffraction (XRD) pattern of the honeycomb material is shown in FIG. 1. No evidence of glassy phase was observed. The material as is evident from this pattern is very crystalline mullite. Chemical analysis done using EDX analysis showed the whiskers have a mullite composition (40.0% Al, 11.4% Si and 48.6% O).

Figure 2:
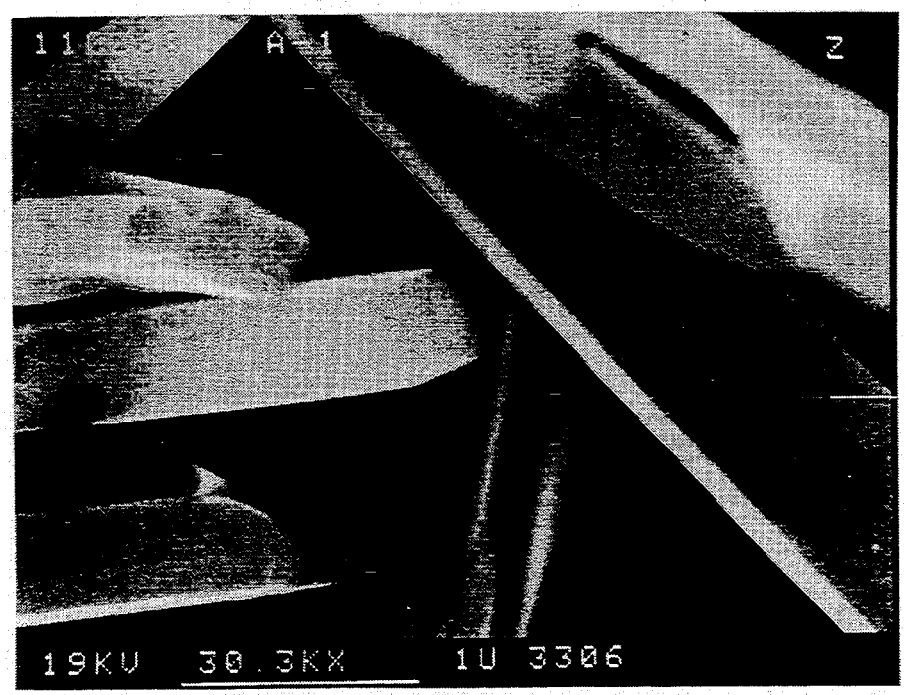
FIG. 2 is a scanning electron micrograph of the surface of a T-0 specimen.
Figure 3:
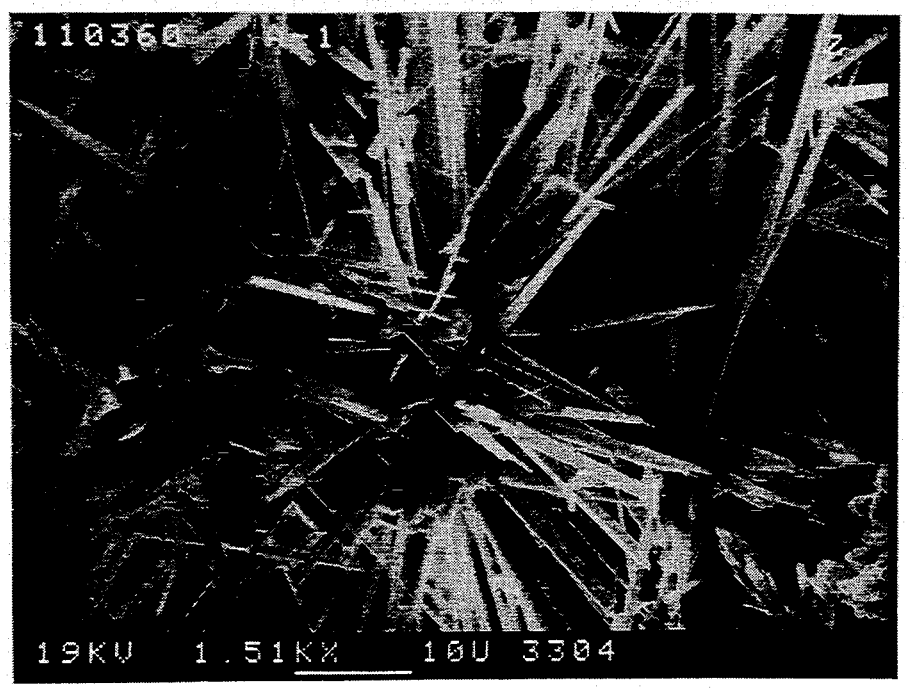
FIGS. 3 and 5 are micrographs of T-0 material.
Figure 4:
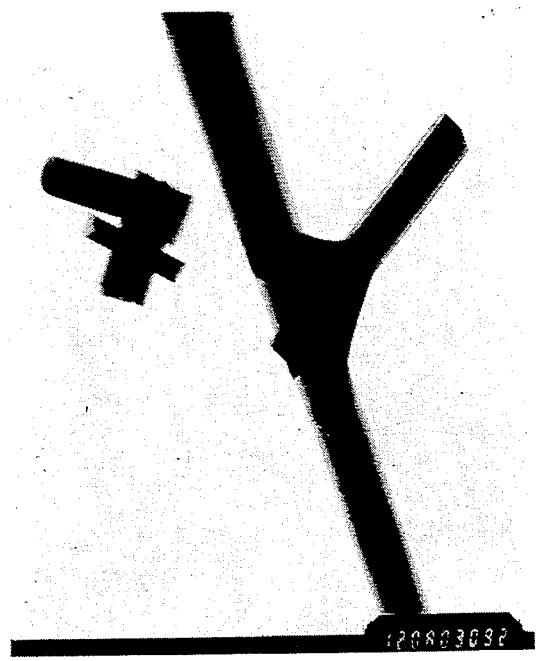
FIG. 4 is a micrograph depicting a joint formed between two pieces of mullite whisker material.

The scanning electron micrograph (SEM) of the fracture surface reveals the microstructure of this material as shown in FIG. 2. The material is basically an open 3-dimensional whisker structure, with interconnected whiskers of sizes ranging from 0.05 to 10 microns or larger in diameter. Individual whiskers appear to be very crystalline with very smooth surfaces (FIG. 3). The transmission electron micrograph of the whiskers showed that they are branched and interconnected with very clean boundaries, exhibiting very little or no glassy phase at the site of interconnection (FIG. 4).

The honeycomb pieces were machinable. Four holes were drilled using an electric drill with a 3/32 drill bit. The holes were ¼" apart from each other. There was no apparent cracking around the holes.

EXAMPLE 2

Discs of green material composed of hydrated aluminum fluoride, silica, Methocel and water were dry pressed into forms 13 millimeter in diameter with heights varying between 5 to 9 millimeters. The $AlF_3$/$SiO_2$ ratio was kept at 2/0.968. The discs were fired in flowing nitrogen at 1400° C. Compression strength of the discs was evaluated using a screw driven Instron equipment (Model 4202) at a crosshead speed of 0.0075 in/min. The average strength was obtained as 310±56 psi. Elevated temperature tests showed compression strengths at 1200° C., 1300° C. and 1400° C. of 306±49, 243±31 and 220-±37 psi, respectively.

EXAMPLE 3

Aluminum fluoride hydrate and silica powders each with top sizes of 45 microns were ground separately in anhydrous ethanol in an Eiger mill using zirconia ball media. Handling of aluminum fluoride in a water-free environment at this point is important in order to maintain a flowable powder. The powders were then ground to less than 10 microns and oven dried and in a molar ratio of 12:13 and mixed in ethanol in the above described Eiger mill. No ball media was used. The stoichiometric mixture was then oven dried. Methocel in the form of 0.2% solution was manually added to the mix. Discs were formed, dried in an oven then fired in flowing nitrogen at 1400° C. Room temperature compression strength of these discs was 667±41 psi. The described pregrinding of the reactants, which resulted in initial powders finer than 45 microns, thus improved the strength of the porous mullite discs.

Backpressure measurements on these discs were performed by flowing nitrogen through them. Back pressures were measured using a differential pressure gauge placed in parallel to the sample disc. Flow rate of the incoming gas was carefully monitored. Backpressure increased as the flow rate increased. As expected, thicker samples showed higher back pressures. The permeability coefficient of the filter material was calculated using Darcey's equation. Its value was determined as $3.86 \pm 1.12$ $(\times 10^{-13})$ $m^2$.

EXAMPLE 4

Figure 5:
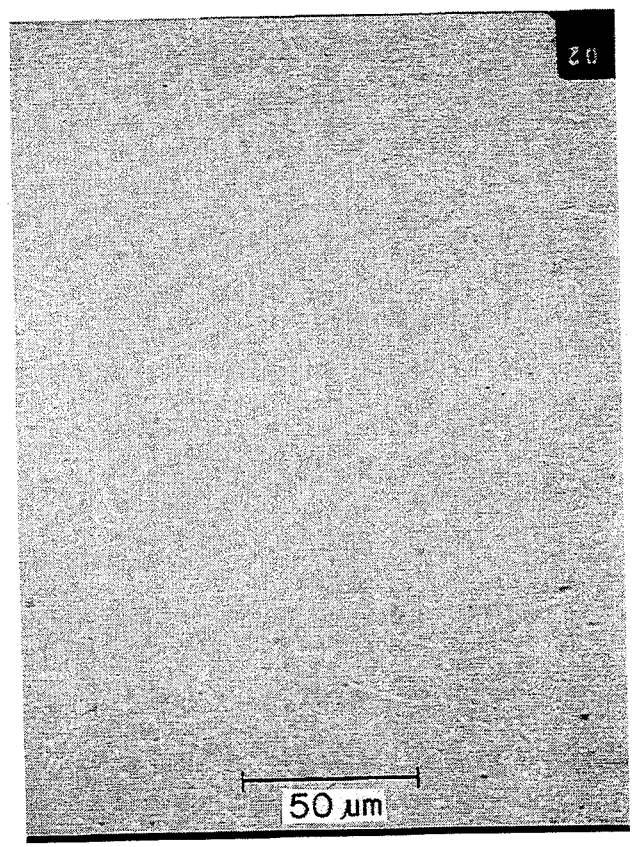

Aluminum fluoride hydrate and silica powder were ground and discs were prepared as described in Example 3. Two discs were placed on top of each other and fired in flowing air at 1400° C. FIG. 5 shows the interface between the two discs after firing. The joint zone is approximately 20 microns. The darker color background is epoxy used in sample preparation for microscopy. Whiskers grew from each disc and joined the two discs. The joint appears uniform and no glassy phase is apparent at the boundary.

EXAMPLE 5

An alumina fluoride hydrate, silica, Methocel mixture was prepared as described in Example 3, extruded through an 11 cell/square inch die to form a honeycomb and fired in flowing nitrogen 1400° C.

A mullite precursor sol mixture was then prepared using 15 grams of a 26% silica and 4% alumina sol mixture (NALCO ISJ-612) and 93.3 grams of a 10% alumina sol (NALCO-ISJ-614). The sol mixture was stirred for four days using a magnetic stirrer. The honeycomb piece was then dipped in the sol mixture twice, dried at 120° C. and dipped twice again followed by drying at 120° C. The honeycomb was then fired to 1400° C. and weighed upon cooling. A weight gain of 10% was noted. Repeated examples showed weight gains of up to 20% or more, demonstrating that densification of fired honeycombs could be easily achieved.

EXAMPLE 6

Two sample geometries of mullite whisker material were prepared. These were simple honeycombs (1.5 inch dia., with 11 cells/square inch) and discs (13 mm dia.). The apparent densities were varied to observe the effect of porosity on key parameters such as strength and backpressure. These samples were prepared by adding graphite into the mix, the graphite burning off at a temperature range of 600°-800° C. resulting in increased porosity.

1) Strength

Figure 6:
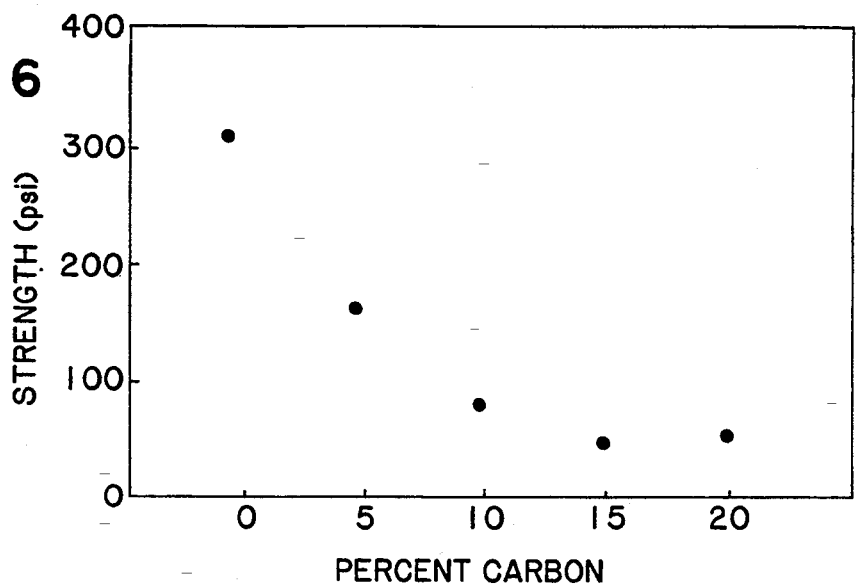
FIG. 6 is a plot of compression strength of a mullite whisker article vs. carbon content of reactants.

Several discs (13 mm dia.) were prepared by dry pressing. Samples were heat treated in nitrogen at 1300° C. for 12 hours. The average compressive strength of the fired discs was 310 psi. The specific strength (strength/density) was 16610 inches. Samples with greater porosity, prepared using graphite, had less strength as illustrates in (FIG. 6).

ii) Durability

Figure 7:
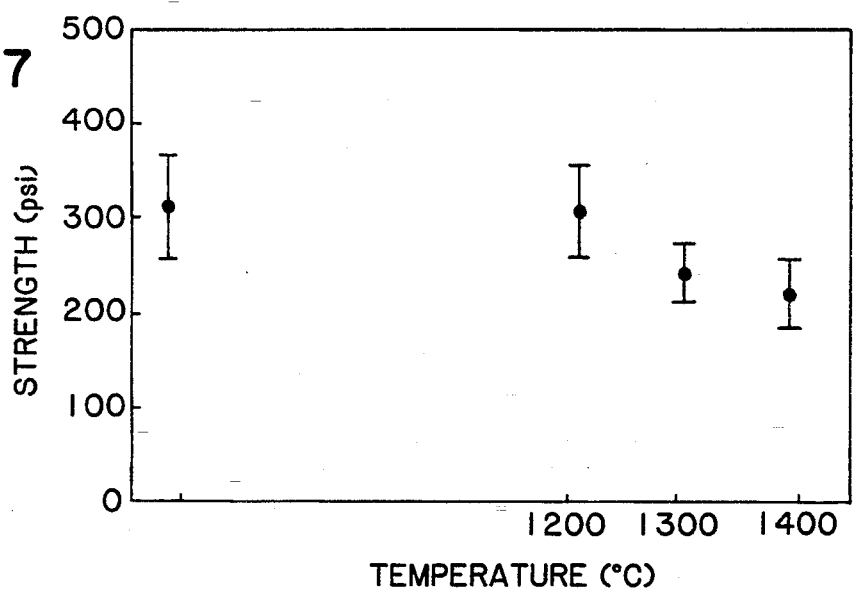
FIG. 7 is a plot of compression strength vs. temperature for mullite whisker articles.
Figure 8:
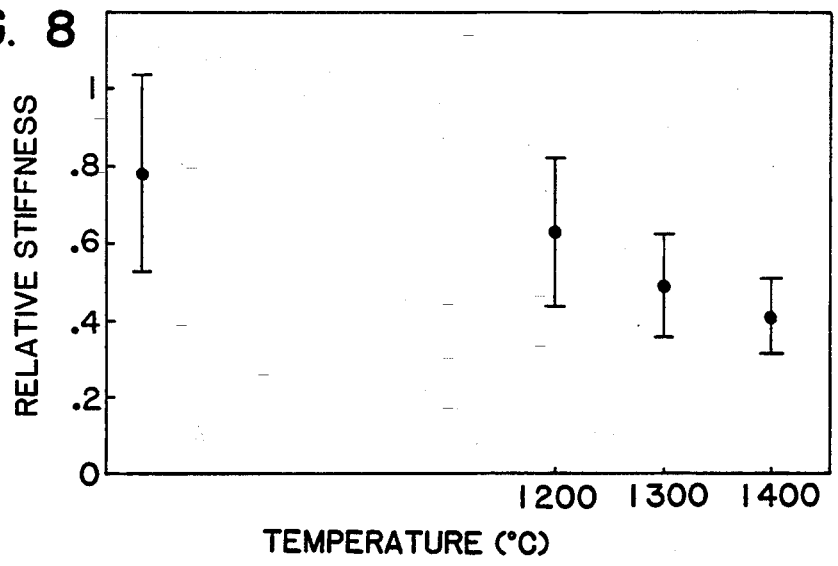
FIG. 8 is a plot of relative stiffness vs. temperature for mullite whisker articles.

Strength as a function of testing temperature is shown in FIG. 7. Room temperature strength was maintained at 1200° C. A 10% drop was observed at 1300° C. At 1400° C. strength was 220 psi, only 25% less than obtained at room temperature. The material was still quite usable at this temperature. FIG. 8 show relative stiffness of the discs as a function of testing temperature. These values were obtained by measuring the slope of the elastic portion of the load vs. time curves.

iii) Thermal Shock Resistance

One honeycomb piece, fired at 1300° C., was thermally shocked in a gas fired furnace from 1000° C. to 600° C. at an approximate rate of 25° C./sec. Visual examination showed no evidence of cracking. The same piece was subsequently shocked from 1100°, 1200°, 1300° and 1400° C. at the same rate to 600° C. After each shock, the piece was visually examined and not cracking was observed. A second honeycomb was shocked from 1300° C. for 5 cycles at a rate of 25° C./sec and ultimately failed. The XRD analysis showed that this piece had cristobalite in it which is expected to be detrimental because of high temperature phase transformations. More severe thermal shock experiments were done with other honeycomb samples. One sample survived water quenching from 100° and 1300° C. at an approximate rate of 280° C./sec. Minor spalling was observed along the circumference of the cylinder.

EXAMPLE 7

A commercial calcined kaolin clay (Satintone #5, a fine particle size calcined kaolin, marketed by Engelhard Corporation) was mixed with powdered $AlF_3$ hydrate (5.52 grams $AlF_3$, 1.80 grams $SiO_2$, 2.22 grams clay and 0.48 gram Methocel), pressed into a pellet and fired in nitrogen to 1300° C. XRD results showed that the final product was principally mullite, alpha-alumina and a minor amount of cristobalite. Since the presence of cristobalite may impair thermal shock resistance, it may be advantageous to compensate for the excess silica in the fired product by adding alumina powder or aluminum fluoride hydrate to the initial powder mix and thereby obtain 100% mullite composition.

EXAMPLE 8

Thirteen grams of a commercial fine particle size hydrous kaolin (Engelhard ASP-172) was added to 465 ml water in a beaker. The beaker was then heated to 90° C. followed by transferring of the contents to a blender in which the mixture was stirred at low speed. Dry Methocel powder, 65 gram, was added to prepare a 14% methocel solution and the mixture chilled and refrigerated.

Aluminum fluoride hydrate and silica powders, 297.5 and 143.9 grams, respectively, were mixed in a ball mill jar and blended overnight, the dry fluoride/silica mixture pug milled, 145.2 grams of the above described Methocel solution being added during milling. After 30 minutes of pugging, the mixture was extruded to a honeycomb shape of approximately 50 cells per square inch using a piston extruder. This mixture was softer and far more easily extruded than those extruded without clay addition to the Methocel mixture. Clay addition reduced the amount of water needed to extrude a cohesive, integral piece.

EXAMPLE 9

This example describes a method to produce mullite whisker honeycomb using topaz as the only aluminum source (T-100) in.

A quantity of 348.5 grams of aluminum fluoride trihydrate was mixed in a pug mill with 151.5 grams of amorphous anhydrous, fused amorphous silicon dioxide, from Thermal American, Montville, N.J. (−325 Mesh). To this mixture, 21.6 grams of dry Methocel ® methyl cellulose was added. The mix was pugged for 15 minutes. A total of 130 mls. deionized water was added to the mix. Pugging continued for 30 more minutes. The paste was then extruded through a multiple die with 1/16" openings using a piston extruder to spaghetti shape. The uncovered extrudates were then fired in flowing air at 7500° C. for 12 hours. Weight loss upon firing was 52%. The XRD analysis showed that the sole crystalline phase in the fired product was topaz. A total of 441 grams of topaz was prepared as described above were mixed with 24 grams of silicon dioxide (the same as used above) in a ball mill with liquid medium being ethyl alcohol. After being ball milled 24 hours, the mixture was filtered and dried. The dried mixture was mixed with 23 grams of Methocel 20-213 binder and mixed in a pug mill. A total of 140 mls. of water was added to produce an extrudable paste. The mix was then extruded through a 50 cpsi 1.5" die to a honeycomb shape using a piston extruder; wall thickness was about 0.9 mm. The honeycomb pieces were then fired in flowing air using a heating schedule of 10° C./min to 350° C.; hold 7 hours at 350° C.; 10° C./min to 1000° C.; 8° C./min into 1300° C.; 5° C./min to 1400° C. hold 90 minutes. The furnace was then cooled 25° C./min to 1400° C. to produce mullite. The final extrudate was stronger than that obtained by extruding aluminum fluoride and silica.

Figure 9:
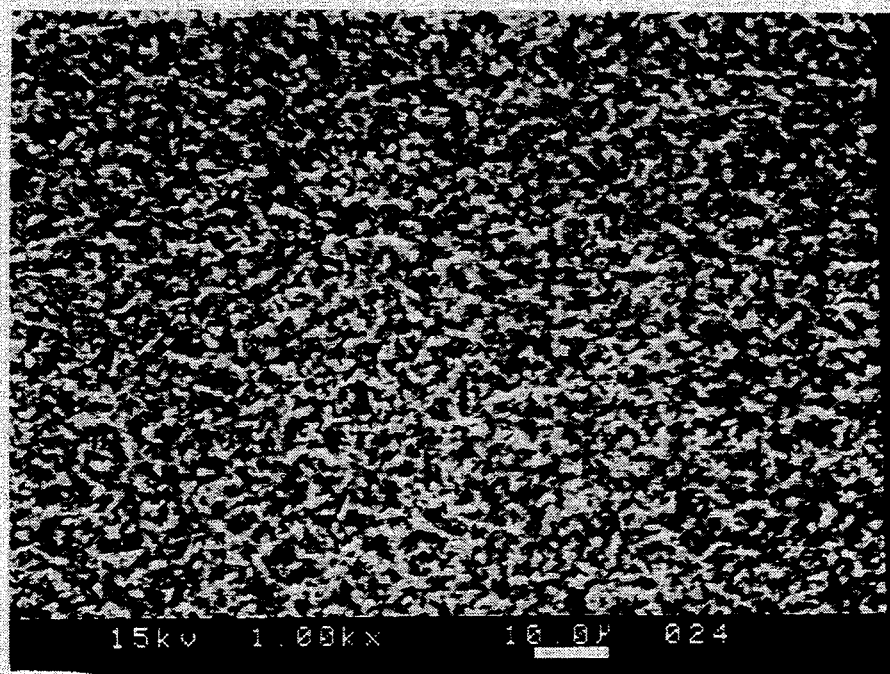
FIG. 9 is a micrograph of the structure of a honeycomb produced from the topaz (T-100) route.
Figure 10:
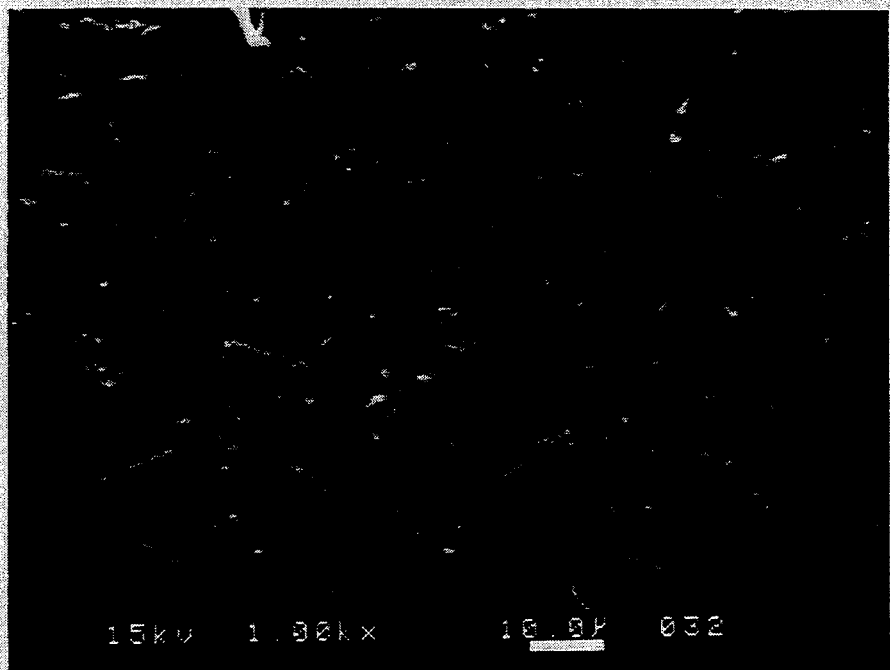
FIG. 10 is a micrograph of the structure of a honeycomb produced directly from aluminum fluoride and silica.

FIGS. 9 and 10 show the microstructures of this topaz produced honeycomb and one obtained by firing aluminum fluoride trihydrate with silica alone, respectively. The denser interconnected whisker network present in the material produced by the topaz route of this example is apparent from a comparison of these figures.

The pieces had large cracks and therefore porosity was not measured; however 35% weight loss was observed in a similar run (see Example 11). Surface area of the product (BET) was 1 $m^2$/gram. Aspect ratio of the whiskers was greater than 100:1. Whiskers are 100% dense. See whisker SEM micrographs.

Figure 11:
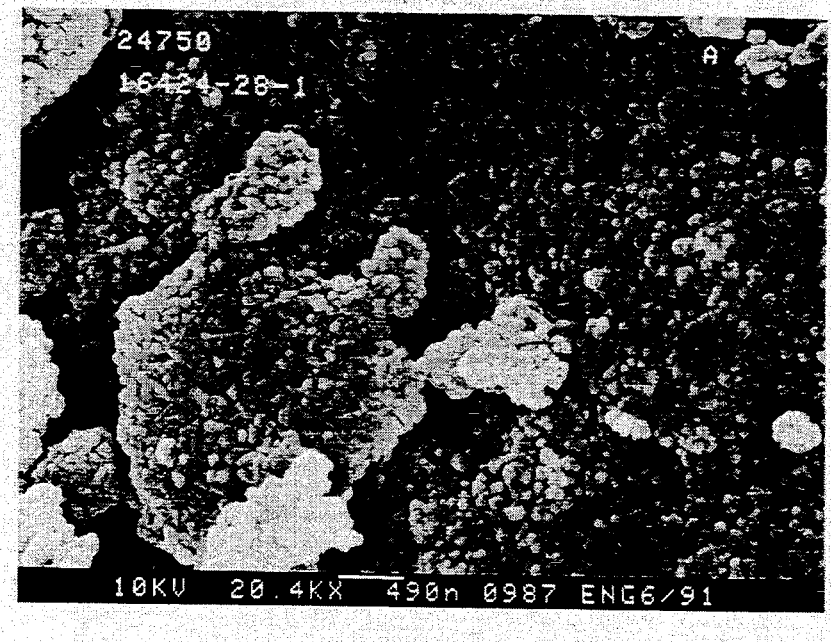
FIG. 11 is an SEM photomicrograph at 20,000 magnification showing the microstructure of microspheres of kaolin clay fired to mullite and then leached with caustic to remove free silica formed during the reaction.
Figure 12:
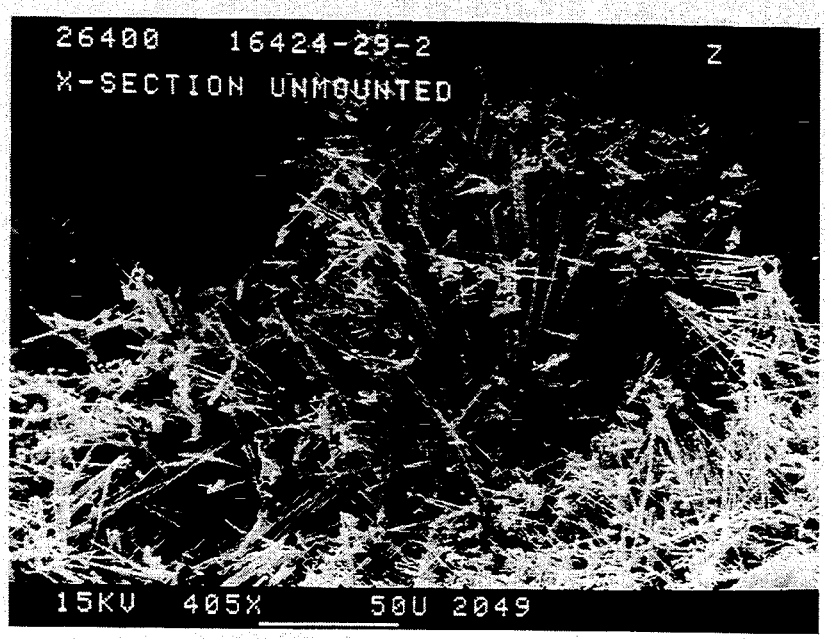
FIG. 12 is an SEM micrograph of a honeycomb wall of a mullite whisker material with T-50 composition.

Similar tests were carried out with both nitrogen and air firing to 1300°–1500° C. as the peak temperature. Results did not show a difference in the products. For further purposes of comparison, FIG. 11 shows the microstructure of a mullite article prepared by firing microspheres kaolin to mullite and leaching the free silica. The particles on the surface of the microspheres are cigar shaped with an aspect ratio of 3:1 with about 0.1 microdiameter.

EXAMPLE 10

This example shows that topaz induced mullite whisker honeycomb can be produced by extrusion using a glycol plasticizer as an extrusion aid.

A topaz/silica mixture was prepared as described in Example 9. Polyethylene glycol was added to the dry mixture in amount less than 1% by wt. A total of 5% of dry Methocel binder was added. A total of 110 ml. water was added to produce extrudable paste. The mix was then extruded and fired as described in Example 9. The appearance and properties of the honeycombs were same as described in Example 9. The weight lost on firing was 35%.

EXAMPLE 11

This example shows that topaz can be added to aluminum fluoride trihydrate and silicon mixture, extruded to honeycomb shape and fired to produce an interconnected mullite whiskers honeycomb. In this example, 30% of the mullite whiskers were generated from reaction of topaz and silica, whereas the rest was formed in situ from reaction of aluminum fluoride trihydrate and silica.

A dry mix was made by blending 249 grams of aluminum fluoride trihydrate, 120 grams of silicon oxide and 71 grams of topaz prepared as described in Example 9. Methocel binder, 26 grams, was added to the dry mix. A total of 107 mls. of water was added and pugged for 40 minutes. The mix was then extruded to a honeycomb shape through a 50 cpsi die via a piston extruder. The extrudates were then fired at 1400° C. in air. Weight loss of 55% was observed upon firing. The resulting extrudates were all composed of interconnected mullite whiskers, of which 30% were generated by the reaction of topaz and silica. The rest of the whiskers were formed by the reaction of aluminum fluoride and silica. The honeycomb was denser and stronger than the one described in Example 1 which is T-0 (no topaz added to initial dry mix). The product of Example 11 is designated as T-30 since 30% of the whiskers were generated from the barlike topaz added to the initial mix. Examples 9 and 10 describe preparation of T-100 product (i.e. no $AlF_3.3H_2O$ was used in the initial mix). Only topaz and silica were used to produce honeycombs.

It was found that strength and density were higher when using the higher topaz content in the reactant mix, but porosity was lower.

EXAMPLE 12

A four-component dry powder mix was blended in a pug mill. The mix was composed of 249 grams of aluminum fluoride trihydrate, 120 grams of fused silica, 71 grams of topaz prepared as described in Example 9, and 22 grams of dry Methocel powder. Polyethylene glycol (Dow Chemical Polyglycol E-400) was added, in amount of 0.5 wt. % of dry materials, to the mixture. A water volume of 91 mls. was added to the mix and pugged for 45 minutes. A second batch was made following the same procedure to double the size of the paste. Both batches were fed to a twin screw extruder and honeycomb pieces with 64 cpsi and 2"×2" were extruded. Some of the extrudates were air dried while others were dried in a conventional kitchen type microwave oven at medium heat. Microwave dried pieces appeared to be smoother on the outside surfaces with fewer cracks. Some pieces were heated in the microwave in the presence of water vapor which was generated by water present in a one liter beaker located inside the microwave cavity. These pieces had the least number of flaws on the outside. The pieces were then fired at 1400° C. to have the same composition as described in Example 11.

EXAMPLE 13

This example describes the preparation of a T-50 honeycomb using a twin-screw extruder where mixing and extruding are both done using the same piece of equipment. Aluminum fluoride was slightly more than the stoichiometric amount required to make T-50 product to compensate for the volatile fluorine loss at elevated temperatures before the onset of the reaction of aluminum fluoride with silica.

A total of 24.4 lbs. of aluminum fluoride trihydrate was blended with 15.7 lbs. of topaz prepared as in Example 9 in a sigma mixer. This mix was fed dry via a loss-in-weight type feeder to a co-rotating twin screw extruder at a rate of 73.8 lbs./hr. A mixture of silica (same as Example 1) and dry Methocel, at a ratio of 100:15, was fed at a rate of 26.2 lbs./hr. simultaneously. A water/glycol mixture (2.7% glycol) was also independently fed to the extruder. The powders and liquid were mixed and conveyed through the chilled barrels of the extruder and through a 2"×2" 64 cpsi honeycomb die. The extrudates were then sliced to various lengths and dried either in air or in microwave oven in the presence of water vapor as described in Example 9. The extrudates did not show cracking on the outside surfaces and fired to form interconnected mullite whiskers, of which 50% was generated by the reaction of topaz and silica.

EXAMPLE 14

This example shows that colloidal silica can be used to replace amorphous fused silica powder to produce shapes which produces stronger product.

A quantity of 9.6 grams of topaz prepared as described in Example 9 and 0.4 grams of dry Methocel powder was mixed with 1.92 grams of hydrous colloidal silica (NALCO-1050) containing 50% silica by weight, the balance being water. Water was added gradually so that the paste had 21% water. The mix was then pressed to 1.25" diameter discs at a pressure of 5000 psi at 80° C. The discs were then fired and cut to make bend bars with approximately 6.8×3.3 mms. cross section. The bars were tested for strength by three point bending tests and their strength varied between 7000–9000 psi. Strength of the material made using colloidal silica was higher by 2000–3000 psi than that made by amorphous powder silica.

EXAMPLE 15

A total of 450 grams of aluminum fluoride trihydrate, silica/Methocel mixture and −100 mesh topaz prepared as in Example 9, was blended in the same ratio used in Example 13 in a sigma blade pug mill. To this mixture water/glycol mixture was added as a 2.7% glycol solution and the mixture was pugged until a paste suitable for extrusion was obtained. The paste was then pressed through a 50 cpsi die using a ram press to obtain honeycomb shaped profiles of 1.5" diameter. The pieces were then dried and fired in air at a temperature of 1400° C. for full conversion of reactants to mullite. One piece was then coated with a standard commercial precious metal containing autocatalyst washcoat based on alumina. The piece was then dried and calcined to observe adhesion of catalyst washcoat to the substrate. The washcoat adhered to the substrate uniformly after calcining. The piece was then tested for catalytic activity for $C_7H_{16}$ oxidation, $SO_2$ to $SO_3$, CO to $CO_2$, and NO to $NO_2$ using a diagnostic reactor. The results of the conversion are listed below:

| Species | Conversion Rate |
|---|---|
| $C_7H_{16}$ oxidation | 37% |
| $SO_2$ to $SO_3$ | 23% |
| CO to $CO_2$ | 62% |
| NO to $NO_2$ | 3% |

These results demonstrate that mullite whisker honeycombs can be coated with commercial precious metal based washcoats and the catalyst deposited on the substrate is active in oxidizing hydrocarbons, O, NO and $SO_2$. Also, the catalyst deposited on mullite whisker material is active and oxidizes hydrocarbons, CO, NO and $SO_2$.

EXAMPLE 16

This example describes a method to join two pieces of fired honeycombs to form larger pieces using topaz to form a strong, dense joint.

55.2 grams of topaz, produced in a whisker furnace in spaghetti form, as described in Example 9, was mixed with 3.0 grams of fused silica (Thermo American, −325 Mesh) in a 200 cc capacity ball mill filled halfway with alumina balls. Water was added to cover the balls and the mixture was milled for 48 hours to a very fine powder suspension. The slurry was then recovered and placed in a closed jar. The jar was not disturbed for seven days. It was observed that the contents in the jar were gelled.

Two mullite honeycomb pieces with 100 cpsi and T-50 composition were sliced parallel to the honeycomb wall direction. The topaz/silica gel was then spread on both faces of the honeycomb walls and two pieces were pressed under 1 kg load overnight. The joined dry piece was then fired in the whisker furnace in air to 1400° C. for 12 hours. The product appeared to have a solid joint upon firing.

Various changes and modifications can be made in the process and processes of this present invention without departing from the scope and spirit thereof. The various embodiments disclosed herein are for the purpose of further illustrating the invention but are not intended to limit it.

We claim:

1. A process for forming a honeycomb-shaped article comprising interconnected mullite whiskers comprising the steps of:
   a. preparing a mixture of a fugitive binder, hydrated aluminum fluoride and silicon dioxide, the proportions of hydrated aluminum fluoride and silicon dioxide being approximately stoichiometric to form topaz;
   b. forming said mixture from Step (a) into a coherent green body;
   c. firing said body from Step (b) until said body is converted substantially completely into interconnected bar-like topaz crystals;
   d. recovering said bar-like topaz crystals and mixing them with a material capable of forming mullite by reaction with topaz, said material being selected from the group consisting of silicon dioxide, a mixture of silicon dioxide and hydrated aluminum fluoride, and a mixture of silicon dioxide, hydrated aluminum fluoride and alumina, together with a fugitive binder;
   e. forming the mixture from Step (d) into a honeycomb; and
   f. firing said honeycomb at elevated temperature while removing volatiles as they are formed until substantially complete conversion of said honeycomb to mullite whiskers occurs, the firing in Steps (c) and (f) being carried out in a furnace provided with an external peristaltic pumping system which continuously sucks gases formed during the reaction from inside the furnace to outside the furnace, and gases sucked from the furnace are charged to a scrubber unit.

* * * * *